United States Patent [19]
Meyer et al.

[11] Patent Number: 5,508,974
[45] Date of Patent: Apr. 16, 1996

[54] METHOD AND DEVICE FOR ULTRASONIC DISTANCE MEASURING

[75] Inventors: Dieter Meyer, Feucht; Ulrich Kanzler; Klaus Krockenberger, both of Stein; Juergen Leinberger, Nuremberg, all of Germany

[73] Assignee: Robert Bosch GmbH, Stuttgart, Germany

[21] Appl. No.: 322,888

[22] Filed: Oct. 13, 1994

[30] Foreign Application Priority Data

Oct. 20, 1993 [DE] Germany .......................... 43 35 728.8

[51] Int. Cl.⁶ ..................................................... G01S 15/00
[52] U.S. Cl. ................................................. 367/99; 367/97
[58] Field of Search ............................... 367/99, 909, 97, 367/105

[56] References Cited

U.S. PATENT DOCUMENTS

| | | | |
|---|---|---|---|
| 4,500,977 | 2/1985 | Gelhard | 367/108 |
| 5,241,515 | 8/1993 | Harms et al. | 367/105 |

FOREIGN PATENT DOCUMENTS

| | | |
|---|---|---|
| 0092899 | 11/1983 | European Pat. Off. . |
| 0138379 | 4/1985 | European Pat. Off. . |
| WO/92/19983 | 11/1992 | WIPO . |

OTHER PUBLICATIONS

F. R. Koperda and J. W. Vandenbury, "Ultrasonic Position Indicator", Aug. 1984, IBM Technical Disclosure Bulletin, vol. 17, No. 3, pp. 1670–1672.

Wellhausen, "Ultraschall-Ortungssytem für Flurförderfahrzeuge" (Ultrasonic Tracking System for Industrial Trucks), Elektronik 9, Apr. 27, 1990, pp. 100, 101, 104 and 105.

*Primary Examiner*—Daniel T. Pihulic
*Attorney, Agent, or Firm*—Kenyon & Kenyon

[57] ABSTRACT

In a device for measuring the distance to an obstacle, a second transmission pulse as a control measurement for an ultrasonic distance measurement is transmitted only when an echo signal has been received for a first transmission pulse. In addition, a timing window, within which the expected echo signal falls when it is reflected by an obstacle, is created. In this manner, interference signals are advantageously suppressed and the measuring time is accelerated, so that for an application in a motor vehicle to measure distance, a current measured value is always known while the vehicle velocity and the path covered are taken into consideration.

12 Claims, 1 Drawing Sheet

METHOD AND DEVICE FOR ULTRASONIC DISTANCE MEASURING

FIELD OF THE INVENTION

The present invention relates to a method and a device for measuring the distance to an obstacle with the aid of an ultrasonic sensor.

BACKGROUND INFORMATION

A method and device for measuring distance with the aid of ultrasonic pulses is described, for example, in the publication Wellhausen, "Ultraschall-Ortungssystem für Flurförderfahrzeuge" (Ultrasonic Tracking System for Industrial Trucks), Elektronik 9, Apr. 27, 1990, pp. 100, 101, 104 and 105 (the Elektronik publication). The problem arises here that, given repeated transmission of an ultrasonic pulse and receipt of the echo reflected by an obstacle, the measuring duration is relatively long. The greater the distance of the obstacle from the measuring device mounted on a motor vehicle, the longer the measuring time is. In addition, it is unfavorable that when an echo is missing, the delay (waiting time) can be very long. When a motor vehicle is parked, the long delay can mean that the vehicle is already driven somewhat further on, while the previous measured value is still being displayed. Therefore, the undesirable consequence can be a crash.

SUMMARY OF THE INVENTION

The method and the device according to the present invention have the advantage of allowing the distance to the obstacle to be determined more quickly, since a control measurement is performed only when an echo signal has actually been received.

It is especially advantageous when a timing or measuring window is specified for the time during which the echo is received. This is possible in the simplest case in that the maximum distance to be measured is limited to a specific value and, from this distance, the maximum propagation delay is established for an echo signal. In the case of a missing echo, the measurement can then be stopped, since, for example, no obstacle is to be expected. Furthermore, interference signals which occur randomly and mimic a supposed obstacle are advantageously suppressed.

However, if an echo signal is received, the distance can already be determined from the first measurement, so that a timing window can be established, more or less within which additional echo signals must fall. It is advantageous to consider the vehicle movement carried out in the meantime. This performed repeated measurement produces an average value for the determined distance, which is very reliable, especially as the echo-time errors outside of the established measuring window are suppressed.

It is also advantageous to select the timing window to be symmetrical in relation to the measured propagation delay of the first transmission signal, so that in the case of the control measurement, the expected second echo signal also falls reliably within the timing window.

It is also advantageous to close the timing window before a new transmission pulse begins, in order to avoid an error measurement.

One advantageous application of the method and device according to the present invention is for a parking aid for a motor vehicle. In such a case, during the parking operation, the distance to obstacles situated in the vicinity is continually measured in order to avoid damage to the vehicle.

DETAILED DESCRIPTION

Figure 1:
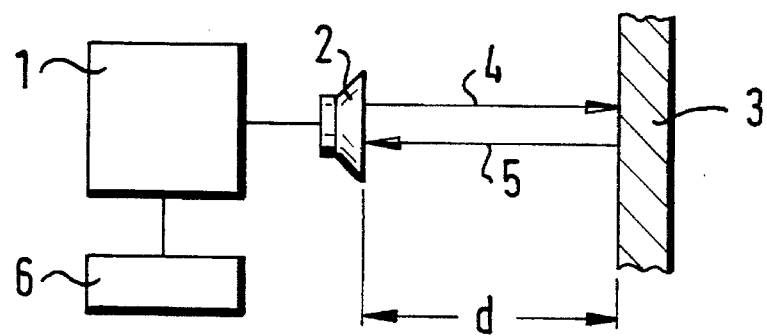
FIG. 1 is a block diagram of a known device for measuring distance.

FIG. 1 depicts a control 1, to which is linked an ultrasonic sensor 2 designed to transmit and/or receive ultrasonic waves or ultrasonic pulses. It emits, for example, a transmission pulse 4, which is reflected as an echo signal by an obstacle 3, for example a wall or a post. From the ultrasonic sensor 2, the obstacle 3 has the distance d, which is passed through in each case by the transmission pulse S and the echo pulse E. The control 1 is connected to a display 6, which scales the determined distance d to the obstacle 3 and outputs it optically or acoustically. This known type of arrangement is described in, for example, the Elektronik publication.

Figure 3:
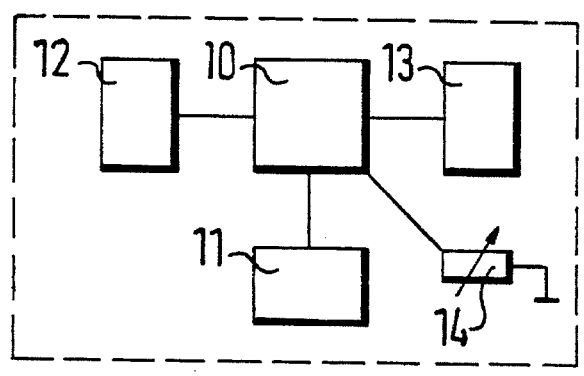
FIG. 3 is a block diagram of the device according to the present invention.

FIG. 3 illustrates a block diagram of a control 1, according to the present invention. A microcomputer 10, which is linked to an ultrasonic transmitter 13, is provided. The ultrasonic transmitter 13 sends appropriate ultrasonic pulses via the ultrasonic sensor 2. In addition, the microcomputer 10 is connected to an ultrasonic receiver 12, which is designed to receive the echo pulses. The microcomputer 10 is connected to a memory device 11, in which values for the maximum distance and/or the timing window are stored. Furthermore, the microcomputer 10 is connected to a threshold-value switch 14, which serves to store limiting values for the measuring window or the maximum range to be measured. The mentioned components are known in detail to one skilled in the art and, therefore, do not need to be discussed further.

Figure 2:
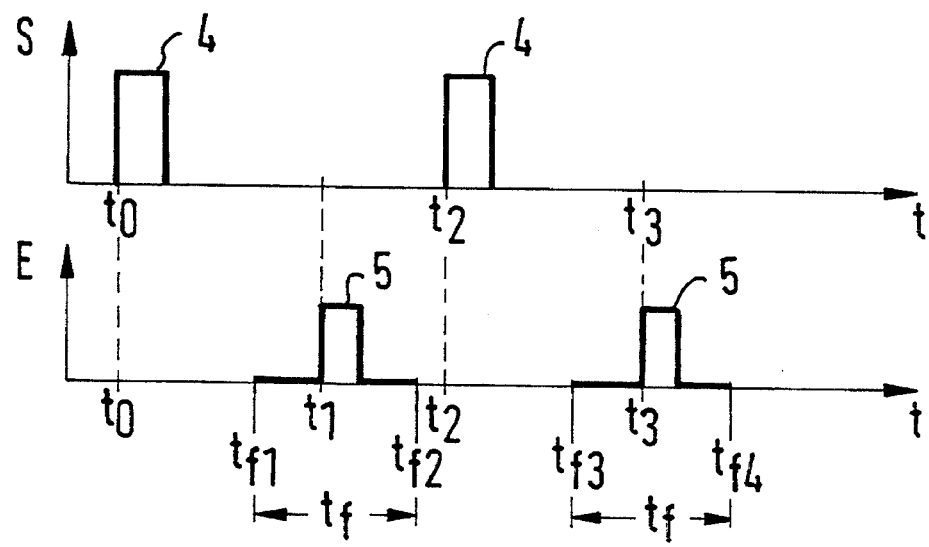
FIG. 2 illustrates the transmission pulses and echo pulses plotted over time, according to the present invention.

The method and the mode of operation of the device according to the present invention are further explained with reference to FIG. 2. FIG. 2 shows two timing diagrams arranged one over the other. Transmission pulses S are plotted over the time axis t in the case of the upper diagram. In the lower diagram, echo pulses E are likewise plotted over the time axis t.

If a transmission pulse 4 is sent off, for instance, at the instant t0 by the ultrasonic sensor 2, then it is received after the time t1 as an echo pulse 5, when it hits the obstacle 3. The distance d is calculated from the time difference t1–t0. Since this first measurement can contain various errors, usually at least one further measurement is performed. The ultrasonic sensor 2 sends another transmission pulse 4 at the instant t2 (upper diagram), so that its echo pulse 5 is received after the time t3. From the echo time t1 of the first echo pulse 5, a window $t_f$ is formed, which includes the instant t1 and is opened at the time $t_{f1}$ and is closed at the time $t_{f2}$. This window is used for the second measurement. The time $t_{f1}$ lies between the time t0 and t1, while the time $t_{f2}$ lies between the time t1 and t2. This window $t_f$ can be advantageously definitively specified or it can be a variable, it being possible—in the case of an application in a motor vehicle—to include the travel distance covered in the meantime or the travel velocity of the vehicle in the window $t_f$. A larger measuring window $t_f$ is selected for a high vehicle velocity than for a low vehicle velocity.

For additional transmission pulses 4, as a control measurement, the selected window is opened at the time $t_{f3}$ and closed at the time $t_{f4}$, since the echo signal t3 is expected within this window $t_f$.

If, after the first transmission pulse 4, no echo is received within this predetermined timing window, this timing window being selected so as to allow detection of the maximum distance to be measured, then no further transmission pulse 4 is sent out. The assumption is made here that there is no obstacle in the area surrounding the vehicle, in particular in the travel direction. Therefore, additional transmission pulses 4 are not needed, so that the measuring time is shortened as a result. By properly selecting the timing window $t_f$, one suppresses interference signals which lie outside of the timing window $t_f$ and, consequently, would simulate an obstacle.

What is claimed is:

1. A method for determining a distance to an object, comprising the steps of:

transmitting a first ultrasonic transmission pulse at a first time;

transmitting a second ultrasonic transmission pulse at a third time only if a first echo pulse corresponding to the first transmission pulse is received at a second time, the first echo pulse being reflected by the object; and determining the distance to the object as a function of a difference between the first and second times.

2. The method according to claim 1, further comprising the step of:

displaying the determined distance to the object on a display.

3. The method according to claim 1, wherein the first and second transmission pulses are transmitted by at least one ultrasonic sensor, and the first echo pulse is received by the at least one ultrasonic sensor.

4. The method according to claim 1, wherein the second transmission pulse is transmitted only if the first echo pulse is received within a first preselected timing window.

5. The method according to claim 4, further comprising the step of:

receiving a second echo pulse within a second timing window, a size and location of the second timing window being determined dependent upon a propagation delay of the first transmission pulse.

6. The method according to claim 5, further comprising the step of:

suppressing the second echo pulse if it is outside of the second timing window.

7. The method according to claim 5, wherein the size and location of the second timing window are determined as a function of the difference between the first and second times.

8. The method according to claim 4, wherein the first timing window is approximately symmetrical with respect to the second time.

9. The method according to claim 4, wherein the first timing window ends prior to the third time.

10. A device for determining a distance to an object, comprising:

a sensor for transmitting a first ultrasonic transmission pulse at a first time, and for transmitting a second ultrasonic transmission pulse at a third time only if a first echo pulse corresponding to the first transmission pulse is received at a second time, the first echo pulse being reflected by the object; and a controller coupled to the sensor for determining the distance to the object as a function of a difference between the first and second times.

11. The device according to claim 10, wherein the controller includes means for selecting a timing window with a size and location determined as a function of at least the second time, a second echo pulse corresponding to the second transmission pulse being received by the sensor within the timing window.

12. The device according to claim 10, wherein the sensor and the controller are mounted in a motor vehicle.

* * * * *